United States Patent
Matsuo

(10) Patent No.: US 11,336,481 B2
(45) Date of Patent: May 17, 2022

(54) WIRELESS COMMUNICATION SYSTEM, COMMUNICATION APPARATUS, SETTING INFORMATION PROVIDING METHOD, SETTING INFORMATION OBTAINING METHOD, AND COMPUTER PROGRAM

(71) Applicant: Sony Corporation, Tokyo (JP)

(72) Inventor: Takashi Matsuo, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/366,369

(22) Filed: Mar. 27, 2019

(65) Prior Publication Data
US 2019/0273630 A1 Sep. 5, 2019

Related U.S. Application Data

(63) Continuation of application No. 13/495,365, filed on Jun. 13, 2012, now Pat. No. 10,270,616, which is a
(Continued)

(30) Foreign Application Priority Data

Nov. 30, 2005 (JP) ................. 2005-345468

(51) Int. Cl.
*H04L 12/28* (2006.01)
*H04W 8/18* (2009.01)
(Continued)

(52) U.S. Cl.
CPC ......... *H04L 12/2856* (2013.01); *H04W 8/183* (2013.01); *H04M 1/72412* (2021.01); *H04M 2250/02* (2013.01); *H04W 48/16* (2013.01)

(58) Field of Classification Search
CPC . H04L 12/2856; H04M 1/7253; H04M 1/605; H04W 8/183
(Continued)

(56) References Cited

U.S. PATENT DOCUMENTS

| 7,284,003 | B2 | 10/2007 | Honda |
| 7,333,514 | B2 | 2/2008 | Anehem et al. |

(Continued)

FOREIGN PATENT DOCUMENTS

| CN | 1633817 A | 6/2005 |
| CN | 1663181 A | 8/2005 |

(Continued)

OTHER PUBLICATIONS

Japanese Office Action dated Jun. 16, 2009 for corresponding Japanese Application No. 2005-345468.

(Continued)

*Primary Examiner* — Allahyar Kasraian
(74) *Attorney, Agent, or Firm* — Michael Best & Friedrich LLP

(57) ABSTRACT

A wireless communication system includes an access point, a master communication apparatus, and a slave communication apparatus, and the master communication apparatus and the slave communication apparatus perform wireless communication through the access point. The master communication apparatus stores setting information necessary for accessing the access point; performs wireless communication through the access point using the stored setting information; and performs near field communication with the slave communication apparatus to transmit the stored setting information to the slave communication apparatus in response to a setting information request received from the slave communication apparatus via near field communication. The slave communication apparatus performs near field communication with the master communication apparatus to transmit the setting information request to the master communication apparatus; receives the setting information from the master communication apparatus via near field communication; stores the setting information; and performs wire- (Continued)

less communication through the access point using the setting information.

18 Claims, 10 Drawing Sheets

Related U.S. Application Data continuation of application No. 11/594,907, filed on Nov. 9, 2006, now Pat. No. 8,213,355.

(51) Int. Cl.
*H04W 48/16* (2009.01)
*H04M 1/72412* (2021.01)

(58) Field of Classification Search
USPC .......................................... 455/552.1, 553.1
See application file for complete search history.

(56) References Cited

U.S. PATENT DOCUMENTS

| | | | |
|---|---|---|---|
| 7,668,508 B2* | 2/2010 | Zheng | H04L 41/12 345/204 |
| 8,010,112 B1* | 8/2011 | Delker | H04L 12/66 455/437 |
| 8,213,355 B2* | 7/2012 | Matsuo | H04W 8/183 370/328 |
| 8,290,872 B2 | 10/2012 | Ahn | |
| 10,270,616 B2* | 4/2019 | Matsuo | H04W 8/183 |
| 2003/0050058 A1 | 3/2003 | Walsh | |
| 2003/0095524 A1 | 5/2003 | Stephens et al. | |
| 2004/0008209 A1 | 1/2004 | Adams et al. | |
| 2004/0144843 A1* | 7/2004 | Fabre | B65G 1/1376 235/385 |
| 2004/0176032 A1 | 9/2004 | Kotola et al. | |
| 2004/0213192 A1* | 10/2004 | Kobayashi | H04W 28/18 370/338 |
| 2004/0243519 A1 | 12/2004 | Perttila | |
| 2005/0036469 A1* | 2/2005 | Wentink | H04W 52/0216 370/338 |
| 2005/0088997 A1 | 4/2005 | Melpignano | |
| 2005/0118991 A1 | 6/2005 | Koganti et al. | |
| 2005/0122934 A1 | 6/2005 | Fujita | |
| 2005/0191968 A1* | 9/2005 | Tabayashi | G06K 7/10297 455/74 |
| 2005/0251807 A1 | 11/2005 | Weel | |
| 2005/0272371 A1 | 12/2005 | Komatsuzaki et al. | |
| 2005/0287950 A1* | 12/2005 | Heiden | H04W 12/50 455/41.2 |
| 2006/0062391 A1* | 3/2006 | Lee | H04W 12/50 380/270 |
| 2006/0072761 A1 | 4/2006 | Johnson | |
| 2006/0075222 A1* | 4/2006 | Moloney | H04L 9/3265 713/156 |
| 2006/0183462 A1* | 8/2006 | Kolehmainen | H04W 12/50 455/411 |
| 2006/0184705 A1 | 8/2006 | Nakajima | |
| 2006/0217147 A1 | 9/2006 | Olvera-Hernandez et al. | |
| 2006/0218040 A1 | 9/2006 | Sabapathypillai | |
| 2006/0223524 A1* | 10/2006 | Ginzburg | H04W 76/23 455/424 |
| 2006/0251256 A1* | 11/2006 | Asokan | H04W 12/50 380/270 |
| 2006/0258323 A1 | 11/2006 | Hara et al. | |
| 2006/0270395 A1 | 11/2006 | Dhawan et al. | |
| 2007/0010261 A1* | 1/2007 | Dravida | G01S 5/0009 455/456.3 |
| 2007/0022055 A1* | 1/2007 | Eliason | G06F 21/10 705/51 |
| 2007/0094691 A1* | 4/2007 | Gazdzinski | H04N 7/17318 725/62 |
| 2007/0105496 A1 | 5/2007 | Bonta et al. | |
| 2009/0186575 A1 | 7/2009 | Cedo Perpinya et al. | |

FOREIGN PATENT DOCUMENTS

| | | |
|---|---|---|
| EP | 1 450 513 A1 | 8/2004 |
| EP | 1 499 067 A1 | 1/2005 |
| JP | 2001-128242 A | 5/2001 |
| JP | 2001-357618 A | 12/2001 |
| JP | 2002-351766 A | 6/2002 |
| JP | 2002-291067 A | 10/2002 |
| JP | 2002-351766 | 12/2002 |
| JP | 2002-373484 A | 12/2002 |
| JP | 2003-32261 | 1/2003 |
| JP | 2003-046703 A | 2/2003 |
| JP | 2003-051869 A | 2/2003 |
| JP | 2003-273791 A | 9/2003 |
| JP | 2004-007351 A | 1/2004 |
| JP | 2004-040528 A | 2/2004 |
| JP | 2004-104460 A | 4/2004 |
| JP | 2004-104653 A | 4/2004 |
| JP | 2004-336538 A | 11/2004 |
| JP | 2005-210328 A | 8/2005 |
| JP | 2005-269088 A | 9/2005 |
| JP | 2005-286463 A | 10/2005 |
| JP | 2007-150984 A | 6/2007 |
| JP | 5837462 B2 | 12/2015 |
| WO | WO-2004-095767 A2 | 11/2004 |
| WO | WO-2006-062194 A1 | 6/2006 |

OTHER PUBLICATIONS

Japanese Office Action dated Nov. 24, 2009 for corresponding Japanese Application No. 2005-345468.
Japanese Office Action dated Dec. 20, 2011 for related Japanese Application No. 2010-013296.
Japanese Office Action dated Jan. 22, 2013 for related Japanese Application No. 2012-12631.
Chinese Office Action dated Sep. 11, 2016 for corresponding Chinese Application No. 2013-10027220.9.
Japanese Office Action dated Aug. 13, 2013 for corresponding Japanese Application No. 2012-149457.
Chinese Office Action dated Jan. 14, 2015 for corresponding Chinese Application No. 2013-100272209.
Japanese Office Action dated Mar. 24, 2015 for corresponding Japanese Application No. 2014-140396.
Japanese Office Action dated Nov. 1, 2016 for corresponding Japanese Application No. 2014-140396—Japanese Document No. 2016-4971.
Japanese Office Action dated Jan. 5, 2016 for corresponding Japanese Application No. 2014-140396.

* cited by examiner

WIRELESS COMMUNICATION SYSTEM, COMMUNICATION APPARATUS, SETTING INFORMATION PROVIDING METHOD, SETTING INFORMATION OBTAINING METHOD, AND COMPUTER PROGRAM

CROSS REFERENCES TO RELATED APPLICATIONS

The present application is a Continuation of application Ser. No. 13/495,365, filed Jun. 13, 2012, which is a Continuation of application Ser. No. 11/594,907, filed Nov. 9, 2006, now U.S. Pat. No. 8,213,355, issued Jul. 3, 2012, which in turn claims priority from Japanese Application Number 2005-345468, filed Nov. 30, 2005, the entire contents of which are incorporated herein by reference.

BACKGROUND OF THE INVENTION

1. Field of the Invention

The present invention relates to wireless communication systems, communication apparatuses, setting information providing methods, setting information obtaining methods, and computer programs. More specifically, the present invention relates to a wireless communication system for performing wireless communication through an access point, in which communication apparatuses can easily obtain setting information necessary for accessing the access point and can readily start wireless communication, a communication apparatus used in the wireless communication system, a setting information providing method, a setting information obtaining method, and a computer program.

2. Description of the Related Art

In a wireless communication system in which a plurality of communication apparatuses perform wireless communication through access points, the individual communication apparatuses have setting information necessary for accessing the access points. The setting information includes, for example, IDs of the access points and key information. In general, users manually input such setting information when setting information is newly registered in the communication apparatuses or when existing setting information is updated in accordance with changes of the access points.

For example, Japanese Unexamined Patent Application Publication No. 2003-32261 discloses a method for easily performing the setting of a communication apparatus using a contactless interface. In the method disclosed in this publication, a mobile phone is equipped with a contactless IC card. The mobile phone perform near field communication using the contactless IC card to transmit the card ID of the contactless IC card of the mobile phone and the Bluetooth device name of a communication partner with which the mobile phone is to communicate to a personal computer serving as a master control apparatus of Bluetooth communication so that the personal computer can specify the communication party. This method allows a user to easily perform wireless communication using the mobile phone without manually inputting the device name, etc.

SUMMARY OF THE INVENTION

In the above-mentioned method, however, it is necessary to move a communication apparatus into a range in which it can perform near field communication with an access point. If the access point is located outside the user's reach, such as in the attic, the user may be inconvenienced.

It is therefore desirable to provide a wireless communication system for performing wireless communication through an access point, in which communication apparatuses can easily obtain setting information necessary for accessing the access point and can readily start wireless communication, a communication apparatus, a setting information providing method, a setting information obtaining method, and a computer program.

According to an embodiment of the present invention, there is provided a wireless communication system including an access point, a master communication apparatus, and a slave communication apparatus, wherein the master communication apparatus and the slave communication apparatus perform wireless communication through the access point. In the wireless communication system, the master communication apparatus includes the following elements. A master-side setting information storage unit stores setting information necessary for accessing the access point. A master-side wireless communication unit performs wireless communication through the access point using the setting information stored in the master-side setting information storage unit. A master-side near field communication unit performs near field communication with the slave communication apparatus. A setting information transfer unit receives a setting information request for requesting the setting information from the slave communication apparatus through the master-side near field communication unit, and transmits the setting information stored in the master-side setting information storage unit to the slave communication apparatus in response to the setting information request. The slave communication apparatus includes the following elements. A slave-side near field communication unit performs near field communication with the master communication apparatus. A setting information obtaining unit transmits the setting information request to the master communication apparatus through the slave-side near field communication unit, and receives the setting information from the master communication apparatus through the slave-side near field communication unit. A slave-side setting information storage unit stores the setting information obtained by the setting information obtaining unit. A slave-side wireless communication unit performs wireless communication through the access point using the setting information stored in the slave-side setting information storage unit.

According to the embodiment of the present invention, a slave communication apparatus that does not have setting information necessary for accessing an access point can obtain the setting information via near field communication from a master communication apparatus having the setting information stored therein. Therefore, a user only moves the slave communication apparatus to a place at which it can perform near field communication with the master communication apparatus so that the slave communication apparatus can automatically obtain the setting information and can perform wireless communication through the access point without the user having to manually input the setting information in the slave communication apparatus and having to directly obtain the setting information from the access point.

According to another embodiment of the present invention, there is provided a communication apparatus for performing wireless communication through an access point. The communication apparatus includes the following elements. A setting information storage unit stores setting information necessary for accessing the access point. A wireless communication unit performs wireless communication through the access point using the setting information stored in the setting information storage unit. A near field communication unit performs near field communication with a second communication apparatus. A setting information transfer unit receives a setting information request for requesting the setting information from the second communication apparatus through the near field communication unit, and transmits the setting information stored in the setting information storage unit to the second communication apparatus in response to the setting information request.

According to the embodiment of the present invention, the communication apparatus can transmit the setting information stored therein to another communication apparatus that does not have the setting information via near field communication. Therefore, a user can only place a communication apparatus having the setting information stored therein close to a communication apparatus that does not have the setting information, thereby transferring the setting information. That is, the communication apparatus according to the embodiment of the present invention allows a user to readily enable another communication apparatus to perform wireless communication through the access point.

The communication apparatus may further include the following elements. A content storage unit stores content data. An access information obtaining unit receives access information through the near field communication unit from the second communication apparatus to which the setting information transfer unit transmits the setting information, the access information being used to access the second communication apparatus through the access point. A content transfer unit accesses the second communication apparatus that is specified by the access information through the wireless communication unit, and transmits the content data stored in the content storage unit. With this structure, the communication apparatus can transmit content data via wireless communication through the access point to the second communication apparatus to which the setting information is transmitted via near field communication. In general, wireless communication through access points realizes higher communication speed than near field communication. Therefore, the communication apparatus can efficiently transfer even content data with a large data size to the second communication apparatus via wireless communication through the access point.

The near field communication unit may include a reader/writer that reads and writes data from and to a contactless IC card. Specifically, for example, the near field communication unit may be configured to perform two-way near field communication using the Near Field Communication (NFC) standard.

According to still another embodiment of the present invention, there is provided a computer program for allowing a computer to function as the above-described communication apparatus. The computer program is stored in a storage unit included in the computer, and is read and executed by a central processing unit (CPU) of the computer, thereby allowing the computer to function as the above-described communication apparatus. Further, there is provided a computer-readable recording medium having the computer program recorded thereon. The recording medium may be, for example, a magnetic disk, an optical disk, or the like.

According to still another embodiment of the present invention, there is provided a setting information providing method performed by a communication apparatus including a wireless communication unit that uses setting information necessary for accessing an access point to perform wireless communication through the access point and a near field communication unit that performs near field communication with a second communication apparatus. The setting information providing method includes the steps of receiving a setting information request for requesting the setting information from the second communication apparatus through the near field communication unit; and transmitting the setting information to the second communication apparatus through the near field communication unit in response to the setting information request. The transmitted setting information may be setting information read from a setting information storage unit having the setting information stored therein.

According to still another embodiment of the present invention, there is provided a communication apparatus for performing wireless communication through an access point. The communication apparatus includes the following elements. A near field communication unit performs near field communication with a second communication apparatus. A setting information obtaining unit transmits a setting information request for requesting setting information necessary for accessing the access point to the second communication apparatus through the near field communication unit, and receives the setting information from the second communication apparatus. A setting information storage unit stores the setting information obtained by the setting information obtaining unit. A wireless communication unit performs wireless communication through the access point using the setting information stored in the setting information storage unit.

According to the embodiment of the present invention, a communication apparatus that does not have the setting information can receive the setting information from another communication apparatus having the setting information stored therein via near field communication. Therefore, a user can only place a communication apparatus that does not have the setting information close to a communication apparatus having the setting information stored therein, thereby transferring the setting information. That is, a user performs a simple operation of placing the communication apparatus according to the embodiment of the present invention close to another communication apparatus having the setting information stored therein so that the communication apparatus can perform wireless communication through the access point.

The communication apparatus may further include the following elements. A content storage unit stores content data. An access information obtaining unit receives access information through the near field communication unit from the second communication apparatus from which the setting information is obtained by the setting information obtaining unit, the access information being used to access the second communication apparatus through the access point. A content transfer unit accesses the second communication apparatus that is specified by the access information through the wireless communication unit, and transmits the content data stored in the content storage unit. With this structure, the communication apparatus can transmit content data via wireless communication through the access point to the second communication apparatus from which the setting information is received via near field communication. That is, a user performs a simple operation to placing the communication apparatus according to the embodiment of the presenting invention close to a second communication apparatus having the setting information stored therein so that the communication apparatus can perform wireless communication through the access point and can also transfer content to the second communication apparatus.

The communication apparatus may further include a transfer-content selecting unit that selects content to be transferred by the content transfer unit from the content storage unit. With this structure, in a case where a plurality of content items are stored in the content storage unit, content to be transferred to the second communication apparatus can be arbitrarily selected.

The communication apparatus may further include a content playback unit that plays back the content. In this case, the transfer-content selecting unit may select, as the content to be transferred by the content transfer unit, content currently being played back by the content playback unit when the transfer-content selecting unit selects content. With this structure, the communication apparatus can automatically designate the currently played back content as the target to be played back even if the user does not clearly designate the content to be transferred, and can transmit the designated content to another communication apparatus.

When the content currently being played back by the content playback unit is selected as the content to be transferred, the content transfer unit may transmit, together with the content data, information regarding a playback position of the content that is currently being played back by the content playback unit to the second communication apparatus. The information regarding the playback position is information for identifying the point up to which the current content has been played back, and includes, for example, an elapsed time from the beginning of playback of the content. Thus, the second communication apparatus to which the content data and the information regarding the playback position are transmitted can play back the content data from a certain point therewithin according to the information on the playback position. That is, in a case where the communication apparatus according to the embodiment of the present invention is playing back content data, the second communication apparatus to which the content data is transferred can play back the content data from the last point at which the content data was played back by the communication apparatus.

The near field communication unit may include a contactless IC card function executing unit that executes a contactless IC card function. The contactless IC card function includes a function for performing contactless near field communication with a reader/writer to transmit and receive data. The contactless IC card function executing unit may be implemented as a contactless IC card, but is not limited to a card-shaped medium.

According to still another embodiment of the present invention, there is provided a computer program for allowing a computer to function as the above-described communication apparatus.

According to still another embodiment of the present invention, there is provided a setting information obtaining method performed by a communication apparatus including a wireless communication unit that uses setting information necessary for accessing an access point to perform wireless communication through the access point and a near field communication unit that performs near field communication with a second communication apparatus. The setting information obtaining method includes the steps of transmitting a setting information request for requesting the setting information to the second communication apparatus through the near field communication unit; and receiving the setting information from the second communication apparatus through the near field communication unit.

According to the above-mentioned embodiments of the present invention, a wireless communication system for performing wireless communication through an access point, in which communication apparatuses can easily obtain setting information necessary for accessing the access point and can readily start wireless communication, a communication apparatus, a setting information providing method, a setting information obtaining method, and a computer program can be achieved.

DESCRIPTION OF THE PREFERRED EMBODIMENTS

Figure 1:
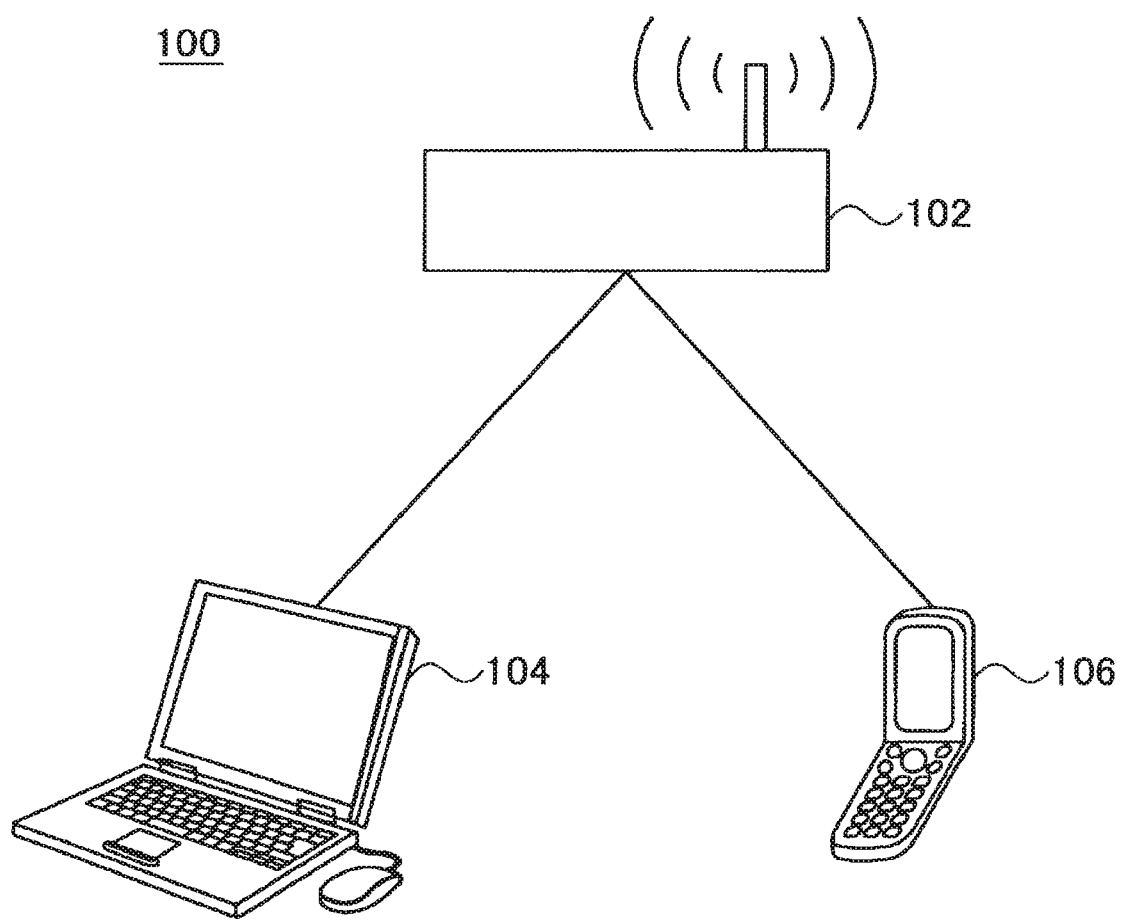
FIG. 1 is a diagram showing an overall structure of a wireless communication system according to a first embodiment of the present invention.

Preferred embodiments of the present invention will be described in detail below with reference to the accompanying drawings. In the specification and the drawings, elements having substantially the same functional structure are assigned the same reference numerals, and a redundant description thereof is omitted.

In the following embodiments, in a wireless communication system in which a plurality of communication apparatuses perform wireless communication through an access point, a first communication apparatus having setting information stored therein necessary for accessing the access point transfers the setting information to a second communication apparatus that does not have the setting information so that the second communication apparatus can obtain the setting information. By transferring the setting information from a communication apparatus having the setting information stored therein to other communication apparatuses, the communication apparatuses can obtain the setting information without users having to manually input the setting information or having to directly obtain the setting information from the access point. The embodiments will be described in detail.

First Embodiment

A wireless communication system according to a first embodiment of the present invention will be described in the context of a wireless communication system 100 including a master communication apparatus 104 and a slave communication apparatus 106 between which wireless communication can be performed through an access point 102.

First, the overall structure of the wireless communication system 100 according to the first embodiment will be described with reference to FIG. 1. The wireless communication system 100 includes the access point 102, the master communication apparatus 104, and the slave communication apparatus 106. While two communication apparatuses, namely, the master communication apparatus 104 and the slave communication apparatus 106, are illustrated in FIG. 1, the wireless communication system 100 may include more than two communication apparatuses.

The access point 102 has a function for relying wireless communication between the communication apparatuses in the wireless communication system 100. More specifically, the access point 102 is a wireless LAN access point, and acts as a rely in a wireless LAN constituted by the communication apparatuses 104 and 106, which are wireless communication apparatuses complying with the IEEE 802.11 standards, for relying radio waves between those communication apparatuses to carry out communication between the communication apparatuses. The access point 102 may have a function for connecting to a wired LAN. The access point 102 is assigned an extended service set identifier (ESSID) for identifying a network. The access point 102 communicates only with a communication apparatus having the same ESSID as the ESSID of the access point 102.

The access point 102 also has a wired equivalent privacy (WEP) key. The WEP key is delivered to communication apparatuses between which communication is relayed by the access point 102, and each of the communication apparatuses uses the WEP key to encrypt and decrypt data to be communicated. That is, in each of the communication apparatuses, the ESSID is necessary to access the access point 102, and the WEP key is necessary to perform wireless communication with other communication apparatuses through the access point 102. In the first embodiment, therefore, setting information necessary for each communication apparatus to access the access point 102 includes at least an ESSID and a WEP key.

The communication apparatuses 104 and 106 are computers capable of performing wireless communication through the access point 102. More specifically, each of the communication apparatuses 104 and 106 is equipped with a wireless LAN adaptor complying with the IEEE 802.11 standards, and the wireless LAN adapters have IDs identical to the ESSID of the access point 102. Therefore, a communication apparatus can perform wireless communication with another communication apparatus having the same ESSID as that of the communication apparatus through the access point 102.

Further, each of the communication apparatuses has a WEP key similar to the WEP key of the access point 102, and can use the WEP key to encrypt and decrypt data to be communicated. That is, by obtaining setting information, each of the communication apparatuses can perform wireless communication with another communication apparatus through the access point 102, and can transmit and receive data. In the first embodiment, in view of their functions, the communication apparatus 104 is referred to as a master communication apparatus 104, and the communication apparatus 106 is referred to as a slave communication apparatus 106.

The master communication apparatus 104 has the setting information stored therein, and has a function for providing the slave communication apparatus 106 with the setting information. The slave communication apparatus 106 does not have the setting information, and has a function for obtaining the setting information from the master communication apparatus 104. The setting information is transmitted and received between the master communication apparatus 104 and the slave communication apparatus 106 using near field communication. The near field communication may be, for example, contactless communication using the Near Field Communication (NFC) standard. Due to its use range as short as about 10 cm, NFC allows a partner communication apparatus to be in control of user's hand actions, resulting in high security.

More specifically, for example, the slave communication apparatus 106 includes a built-in contactless IC chip, which is an example of a contactless IC card function executing unit configured to execute a contactless IC card function, and the master communication apparatus 104 includes a reader/writer that communicates with the contactless IC chip of the slave communication apparatus 106. When the distance between the master communication apparatus 104 and the slave communication apparatus 106 is within the NFC use range, communication is performed between the reader/writer of the master communication apparatus 104 and the IC chip of the slave communication apparatus 106 so that the setting information can be transmitted and received.

The setting information stored in the master communication apparatus 104 may be directly obtained by the master communication apparatus 104 from the access point 102, or may be obtained by the master communication apparatus 104 from another communication apparatus via near field communication. In that case, with respect to the relationship with the other communication apparatus from which the setting information is obtained, the master communication apparatus 104 can be a slave communication apparatus. After obtaining the setting information from the master communication apparatus 104, the slave communication apparatus 106 may transmit the setting information to another communication apparatus via near field communication. In that case, with respect to the relationship with the other communication apparatus to which the setting information is transmitted, the slave communication apparatus 106 can be a master communication apparatus. That is, each of the communication apparatuses belonging to the wireless communication system 100 can function as a master communication apparatus and can function as a slave communication apparatus.

The master communication apparatus 104 and the slave communication apparatus 106 are computers having both the wireless communication function through the access point 102 and the near field communication function. Specific examples of those communication apparatuses may include a personal computer, a television set, a camera, a music player, a game console, a mobile phone, and a personal digital assistant (PDA).

Figure 2:
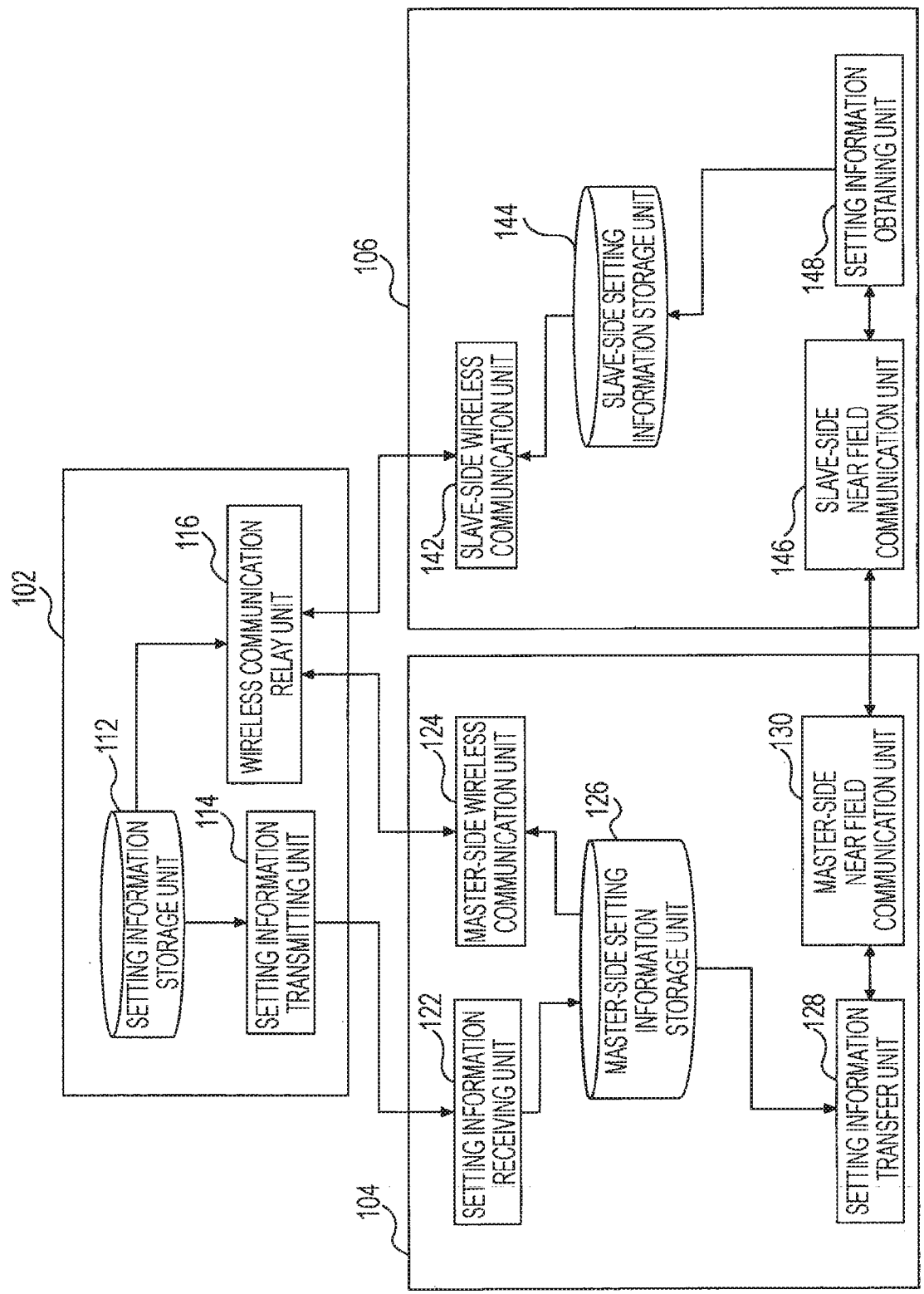
FIG. 2 is a block diagram showing a functional structure of an access point, a master communication apparatus, and a slave communication apparatus in the first embodiment.

The overall structure of the wireless communication system 100 has been described. The functional structure of the access point 102, the master communication apparatus 104, and the slave communication apparatus 106 will now be described with reference to FIG. 2.

Figure 3:
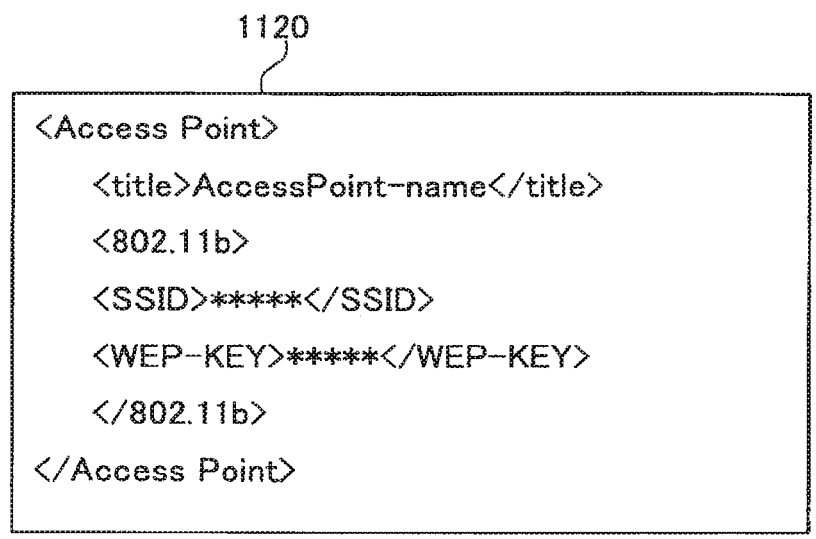
FIG. 3 is a diagram showing setting information in the first embodiment.

The access point 102 mainly includes a setting information storage unit 112, a setting information transmitting unit 114, and a wireless communication relay unit 116. The setting information storage unit 112 stores the setting information. More specifically, the setting information storage unit 112 stores the setting information including the ESSID assigned to the access point 102 and the WEP key. FIG. 3 illustrates setting information 1120 as an example of the setting information. As shown in FIG. 3, the setting information 1120 includes the name of the access point 102, an SSID (ESSID), and a WEP key.

The setting information transmitting unit 114 transmits the setting information stored in the setting information storage unit 112 to another communication apparatus. In the first embodiment, the setting information transmitting unit 114 transmits the setting information to the master communication apparatus 104 via near field communication. The access point 102 and the master communication apparatus 104 may be connected by a wired communication line, and the setting information transmitting unit 114 may transmit the setting information to the master communication apparatus 104 via wired communication.

The wireless communication relay unit 116 relays wireless communication between the master communication apparatus 104 and the slave communication apparatus 106. More specifically, the wireless communication relay unit 116 relays communication between communication apparatuses having an ID identical to the ESSID included in the setting information stored in the setting information storage unit 112. The wireless communication relay unit 116 relays wireless communication between the master communication apparatus 104 and the slave communication apparatus 106 only when the master communication apparatus 104 and the slave communication apparatus 106 have that ESSID.

The master communication apparatus 104 mainly includes a setting information receiving unit 122, a master-side wireless communication unit 124, a master-side setting information storage unit 126, a setting information transfer unit 128, and a master-side near field communication unit 130.

The setting information receiving unit 122 receives the setting information from the access point 102. More specifically, if the access point 102 has the near field communication function, the setting information receiving unit 122 obtains the setting information from the access point 102 via near field communication through the master-side near field communication unit 130. If the master communication apparatus 104 and the access point 102 are connected by a wired communication line, the setting information receiving unit 122 obtains the setting information via wired communication. The setting information receiving unit 122 stores the received setting information in the master-side setting information storage unit 126.

The master-side setting information storage unit 126 stores the setting information. More specifically, the master-side setting information storage unit 126 includes a memory such as a random access memory (RAM) or a hard disk drive (HDD), and stores the setting information obtained from the setting information receiving unit 122.

The master-side wireless communication unit 124 performs wireless communication with another communication apparatus through the access point 102. More specifically, the master-side wireless communication unit 124 includes a wireless LAN adapter complying with the IEEE 802.11 standards, and performs wireless communication using the setting information stored in the master-side setting information storage unit 126. That is, the master-side wireless communication unit 124 sends data including the ESSID that is included in the setting information by means of radio waves, and the radio waves are relayed by the access point 102 with an ID identical to that ESSID, thereby transmitting the data to another communication apparatus having the same ESSID. The master-side wireless communication unit 124 also receives data transmitted from another communication apparatus through the access point 102. In the data transmission and reception process, the master-side wireless communication unit 124 uses the WEP key included in the setting information to encrypt data to be transmitted and to decrypt received data.

The master-side near field communication unit 130 performs near field communication with the slave communication apparatus 106. More specifically, the master-side near field communication unit 130 includes a reader/writer configured to communicate with a contactless IC chip complying with NFC, and transmits and receives data to and from the contactless IC chip of the slave communication apparatus 106. While in the first embodiment, the master-side near field communication unit 130 includes a reader/writer, the present invention is not limited thereto. For example, the master-side near field communication unit 130 may include a contactless IC chip, and the slave communication apparatus 106 may include a reader/writer. Alternatively, each of the master communication apparatus 104 and the slave communication apparatus 106 may include both a reader/writer and a contactless IC chip.

The setting information transfer unit 128 transmits the setting information stored in the master-side setting information storage unit 126 to the slave communication apparatus 106 through the master-side near field communication unit 130. More specifically, upon receiving a setting information request for requesting the setting information from the slave communication apparatus 106 through the master-side near field communication unit 130, the setting information transfer unit 128 reads the setting information from the master-side setting information storage unit 126 in response to the setting information request, and transmits the read setting information to the slave communication apparatus 106.

The slave communication apparatus 106 mainly includes a slave-side wireless communication unit 142, a slave-side setting information storage unit 144, a slave-side near field communication unit 146, and a setting information obtaining unit 148.

Like the master-side wireless communication unit 124, the slave-side wireless communication unit 142 performs wireless communication with another communication apparatus through the access point 102. More specifically, the slave-side wireless communication unit 142 includes a wireless LAN adapter complying with the IEEE 802.11 standards, and performs wireless communication using the setting information stored in the slave-side setting information storage unit 144. That is, the slave-side wireless communication unit 142 sends data including the ESSID that is included in the setting information by means of radio waves, and the radio waves are relayed by the access point 102 with an ID identical to that ESSID, thereby transmitting the data to another communication apparatus having the same ESSID. The slave-side wireless communication unit 142 also receives data transmitted from another communication apparatus through the access point 102. In the data transmission and reception process, the slave-side wireless communication unit 142 uses the WEP key included in the setting information to encrypt data to be transmitted and to decrypt received data.

The slave-side setting information storage unit 144 stores the setting information. The setting information stored in the slave-side setting information storage unit 144 is obtained by the setting information obtaining unit 148 from the master communication apparatus 104.

The slave-side near field communication unit 146 performs near field communication with the master communication apparatus 104. More specifically, the slave-side near field communication unit 146 includes a contactless IC chip complying with NFC, and transmits and receives data to and from the reader/writer of the master communication apparatus 104. Specific examples of the contactless IC chip complying with NFC may include a FeliCa (registered trademark) chip.

The setting information obtaining unit 148 obtains the setting information from the master communication apparatus 104 through the slave-side near field communication unit 146. More specifically, the setting information obtaining unit 148 transmits a setting information request for requesting the setting information to the master communication apparatus 104 through the slave-side near field communication unit 146, and receives the setting information. The setting information obtaining unit 148 stores the obtained setting information in the slave-side setting information storage unit 144.

The functional structure of the access point 102, the master communication apparatus 104, and the slave communication apparatus 106 has been described. The data flow in the wireless communication system 100 when the slave communication apparatus 106 obtains the setting information from the master communication apparatus 104 will be described with reference to FIG. 4.

Figure 4:
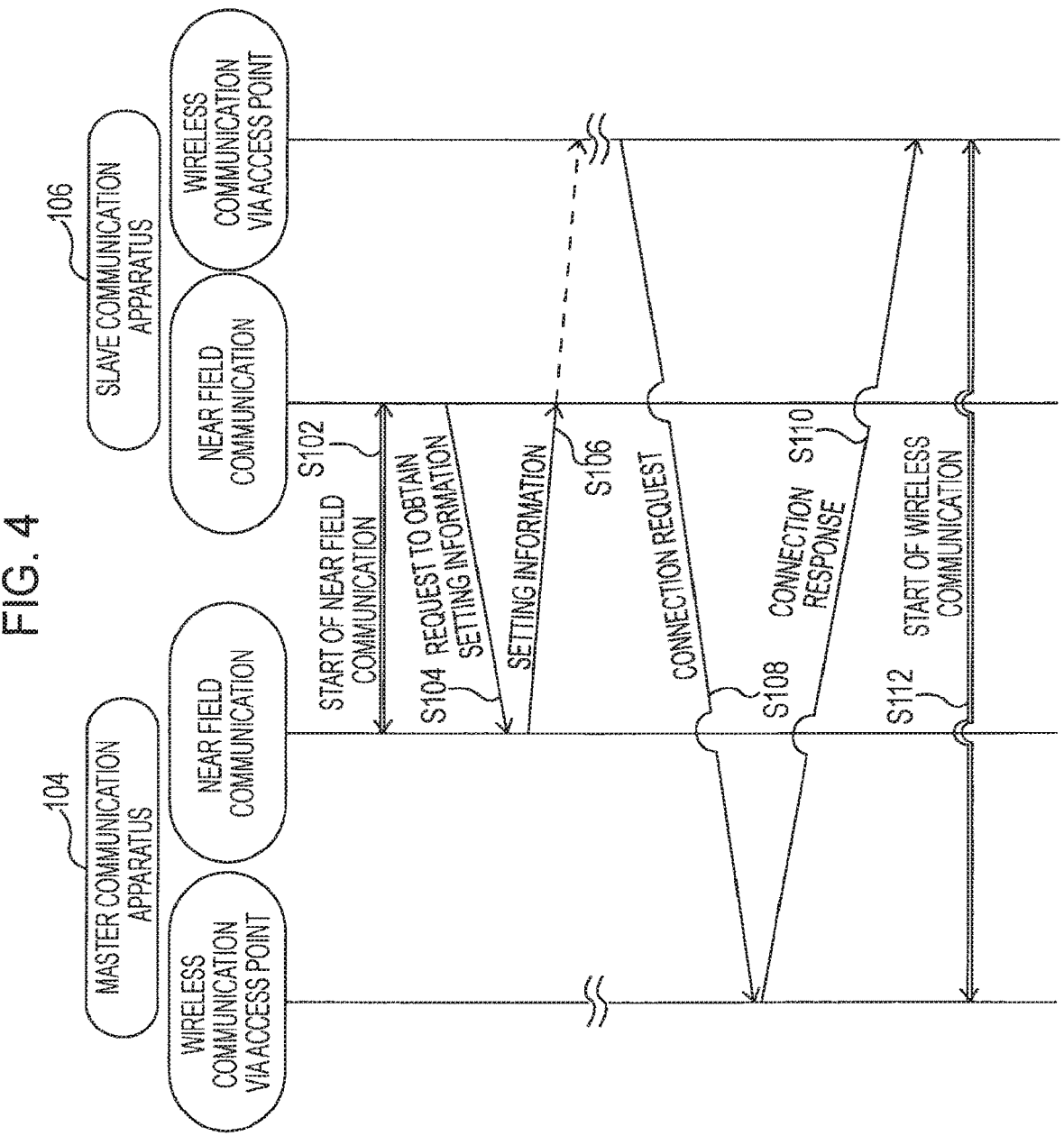
FIG. 4 is a timing chart showing the data flow in the first embodiment.

As shown in FIG. 4, first, near field communication is started between the master communication apparatus 104 and the slave communication apparatus 106 (step S102). More specifically, for example, when the slave communication apparatus 106 is placed close to the master communication apparatus 104 and the distance between the slave communication apparatus 106 and the master communication apparatus 104 is within a range in which they can perform near field communication, the near field communication units 130 and 146 start near field communication.

Then, the slave communication apparatus 106 transmits a request to obtain the setting information to the master communication apparatus 104 via near field communication (step S104). In response to the request to obtain the setting information, the master communication apparatus 104 transmits the setting information stored therein to the slave communication apparatus 106 via near field communication (step S106). Upon receiving the setting information, the slave communication apparatus 106 performs wireless communication through the access point 102 using the setting information. More specifically, the slave communication apparatus 106 sends data including the ESSID that is included in the obtained setting information by means of radio waves, and the radio waves are relayed by the access point 102 having the same ESSID so that the data can be transmitted to another communication apparatus having the same ESSID. The data is encrypted using the WEP key included in the setting information.

For example, when the slave communication apparatus 106 is to perform wireless communication with the master communication apparatus 104, the slave communication apparatus 106 transmits a connection request to the master communication apparatus 104 through the access point 102 (step S108). In response to the connection request transmitted from the slave communication apparatus 106, the master communication apparatus 104 returns a connection response through the access point 102 (step S110), thereby starting wireless communication between the slave communication apparatus 106 and the master communication apparatus 104 through the access point 102 (step S112). The data flow has been described.

As described above, in the wireless communication system 100 according to the first embodiment, since the slave communication apparatus 106 obtains the setting information from the master communication apparatus 104 via near field communication, the user of the slave communication apparatus 106 can move the slave communication apparatus 106 into a range in which it can perform near field communication with the master communication apparatus 104 to obtain the setting information, and can thereafter perform wireless communication through the access point 102. That is, the slave communication apparatus 106 can obtain the setting information from another communication apparatus having the setting information stored therein (the master communication apparatus 104), instead of directly obtaining the setting information from the access point 102, without the user having to manually input the setting information.

Further, the setting information is transmitted and received between the slave communication apparatus 106 and the master communication apparatus 104 via near field communication. Thus, the user can only place the slave communication apparatus 106 close to the master communication apparatus 104 so that the slave communication apparatus 106 can perform wireless communication through the access point 102, which is convenient.

Second Embodiment

A wireless communication system according to a second embodiment of the present invention will be described in the context of a wireless communication system 200 including a master communication apparatus 204 and a slave communication apparatus 206 between which wireless communication can be performed through an access point 102. In the second embodiment, the slave communication apparatus 206 is a similar to that of the first embodiment in that setting information necessary for accessing the access point 102 is obtained from the master communication apparatus 204 via near field communication. The second embodiment is different from the first embodiment in that the slave communication apparatus 206 specifies the master communication apparatus 204 from which the setting information is obtained as a communication party at the other end of the wireless communication through the access point 102, and transmits data to the master communication apparatus 204. The following description will be made with respect to the difference from the first embodiment.

Figure 5:
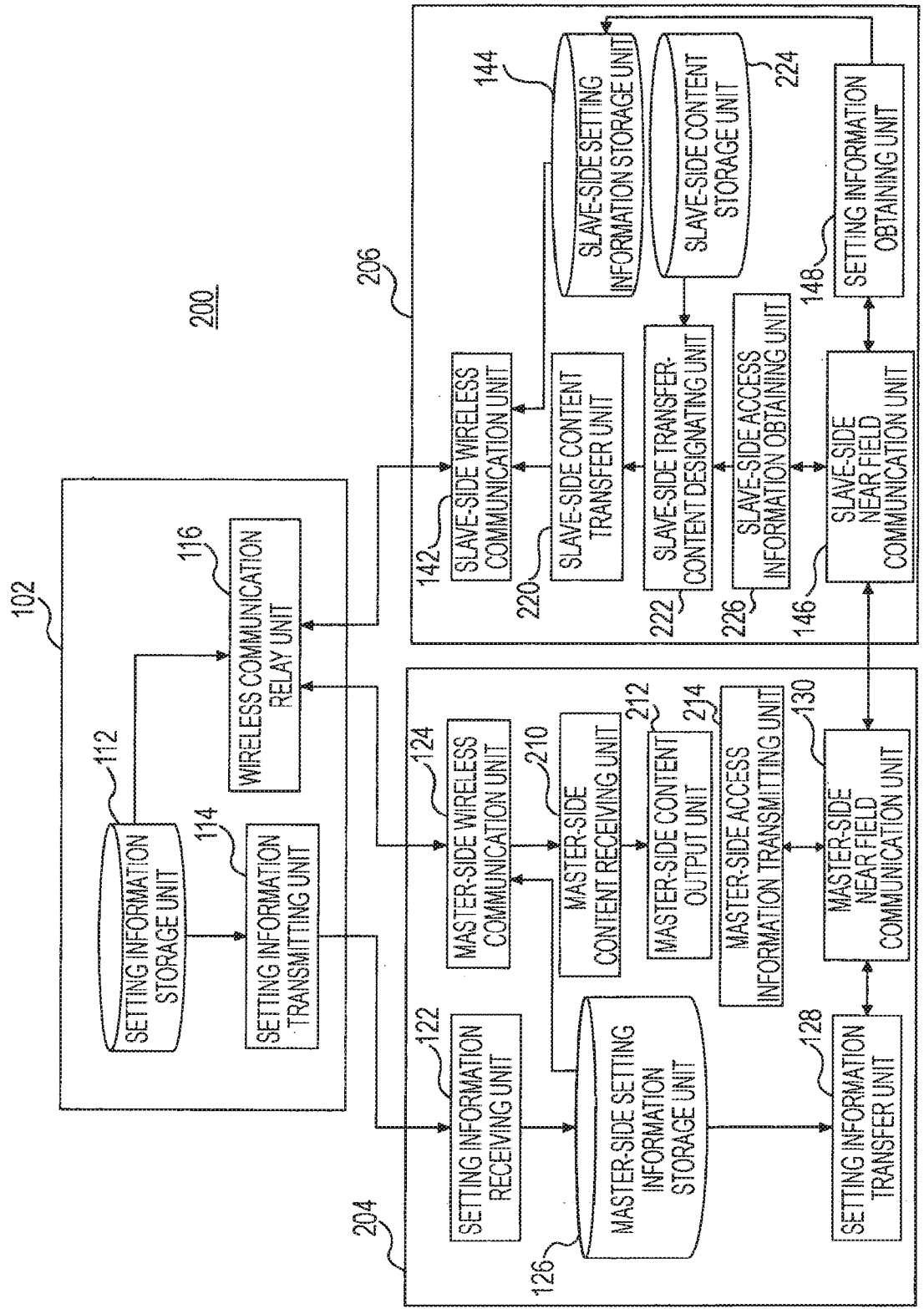
FIG. 5 is a block diagram showing a functional structure of an access point, a master communication apparatus, and a slave communication apparatus according to a second embodiment of the present invention.

The overall structure of the wireless communication system 200 according to the second embodiment will be described with reference to FIG. 5. As shown in FIG. 5, the wireless communication system 200 includes the access point 102, the master communication apparatus 204, and the slave communication apparatus 206. As in the first embodiment, the master communication apparatus 204 and the slave communication apparatus 206 perform near field communication. Further, the master communication apparatus 204 and the slave communication apparatus 206 can perform wireless communication through the access point 102 using the setting information.

The master communication apparatus 204 has the setting information stored therein, and can transfer the setting information to the slave communication apparatus 206. The slave communication apparatus 206 can obtain the setting information from the master communication apparatus 204, and can perform wireless communication through the access point 102 after obtaining the setting information. The slave communication apparatus 206 further obtains access information, which is necessary to communicate with the master communication apparatus 204 via wireless communication through the access point 102, from the master communication apparatus 204 via near field communication, and can use the obtained access information to access the master communication apparatus 204 through the access point 102.

In the second embodiment, the slave communication apparatus 206 is a digital camera having both the wireless communication function through the access point 102 and the near field communication function. The master communication apparatus 204 is a personal computer having both the wireless communication function through the access point 102 and the near field communication function and including a display device that outputs image content. After the setting information and the access information are transmitted and received between the master communication apparatus 204 and the slave communication apparatus 206 via near field communication, image content stored in the slave communication apparatus 206, such as a captured image, is transmitted and received via wireless communication through the access point 102, and the master communication apparatus 204 outputs the image content received from the slave communication apparatus 206 to the display device.

In general, wireless communication through the access point 102 realizes higher communication speed than near field communication. It is therefore more efficient to transmit and receive image content with a large data size via wireless communication through the access point 102. On the other hand, near field communication is not established until the distance between communication apparatuses is relatively close, e.g., within 10 cm. Users therefore keep the slave communication apparatus 206 close to the master communication apparatus 204 during transfer of content such as image content. If the content is transferred via wireless communication through the access point 102, users are not constrained by that limitation.

The overall structure of the wireless communication system 200 has been described. The functional structure of the master communication apparatus 204 and the slave communication apparatus 206 will now be described with reference to FIG. 5. The functional structure of the access point 102 is similar to that of the first embodiment, and a description thereof is thus omitted.

As shown in FIG. 5, the master communication apparatus 204 mainly includes a setting information receiving unit 122, a master-side wireless communication unit 124, a master-side setting information storage unit 126, a master-side content receiving unit 210, a master-side content output unit 212, a master-side access information transmitting unit 214, a setting information transfer unit 128, and a master-side near field communication unit 130. Elements having similar functions to those of the first embodiment are assigned the same reference numerals, and a description thereof is omitted.

The master-side access information transmitting unit 214 transmits access information to the slave communication apparatus 206. The access information is information necessary for another communication apparatus to communicate with the master communication apparatus 204 via wireless communication through the access point 102, and includes, for example, an identifier for uniquely identifying the master communication apparatus 204 within the wireless communication system 200. The master-side access information transmitting unit 214 receives an access information request from the slave communication apparatus 206 through the master-side near field communication unit 130, and transmits the access information to the slave communication apparatus 206 via near field communication in response to the request.

The master-side content receiving unit 210 receives content transmitted from the slave communication apparatus 206. The content includes, for example, music content, audio content such as a performance and a radio broadcast, video content formed of a still image or a moving picture constituting a movie, a television broadcast, a video clip, a photograph, a picture, and a graphic representation, an electronic book (E-book), a game, and a software application. In the second embodiment, the content will be described in the context of image content captured by the slave communication apparatus 206 serving as a digital camera.

The master-side content receiving unit 210 receives through the master-side wireless communication unit 124 the image content transmitted from the slave communication apparatus 206 via wireless communication through the access point 102, and supplies the received image content to the master-side content output unit 212.

The master-side content output unit 212 includes a display device such as a liquid crystal display, a plasma display, or a cathode-ray tube (CRT), and displays the image content obtained from the master-side content receiving unit 210 on the display device.

The functional structure of the slave communication apparatus 206 will now be described with reference to FIG. 5. The slave communication apparatus 206 mainly includes a slave-side wireless communication unit 142, a slave-side setting information storage unit 144, a slave-side content transfer unit 220, a slave-side transfer-content designating unit 222, a slave-side content storage unit 224, a slave-side access information obtaining unit 226, a slave-side near field communication unit 146, and a setting information obtaining unit 148.

The slave-side access information obtaining unit 226 obtains the access information from the master communication apparatus 204. More specifically, the slave-side access information obtaining unit 226 transmits an access information request for requesting access information on the master communication apparatus 204 to the master communication apparatus 204 through the slave-side near field communication unit 146, and receives the access information transmitted from the master communication apparatus 204 in response to the request through the slave-side near field communication unit 146. The access information obtained by the slave-side access information obtaining unit 226 is used to specify the master communication apparatus 204 as a transmission-destination communication apparatus when the slave-side content transfer unit 220 transmits the image content to the master communication apparatus 204 via wireless communication through the access point 102.

The slave-side transfer-content designating unit 222 includes, for example, an input device such as an operation button and a touch panel, and an output device such as a liquid crystal monitor configured to display the image content, and designates a content item to be transferred from among a plurality of image content items stored in the slave-side content storage unit 224. More specifically, the slave-side transfer-content designating unit 222 displays a list of images on the output device so that the user can select the content to be transferred, and obtains one or a plurality of image content items designated by the user through the input device from the slave-side content storage unit 224 to supply the obtained content item or items to the slave-side content transfer unit 220.

The slave-side content storage unit 224 stores content. In the second embodiment, digital data of images captured by an image capturing unit (not shown) of the slave communication apparatus 206 is stored in the slave-side content storage unit 224.

The slave-side content transfer unit 220 transmits the image content designated by the slave-side transfer-content designating unit 222 to the master communication apparatus 204. More specifically, the slave-side content transfer unit 220 performs wireless communication through the access point 102 using the setting information obtained by the setting information obtaining unit 148 from the master communication apparatus 204 and stored in the slave-side setting information storage unit 144. At that time, the slave-side content transfer unit 220 also accesses the master communication apparatus 204 using the access information on the master communication apparatus 204 obtained by the slave-side access information obtaining unit 226. Then, the slave-side content transfer unit 220 transmits the image content designated by the slave-side transfer-content designating unit 222 to the master communication apparatus 204 specified by the access information via wireless communication through the access point 102.

Figure 6:
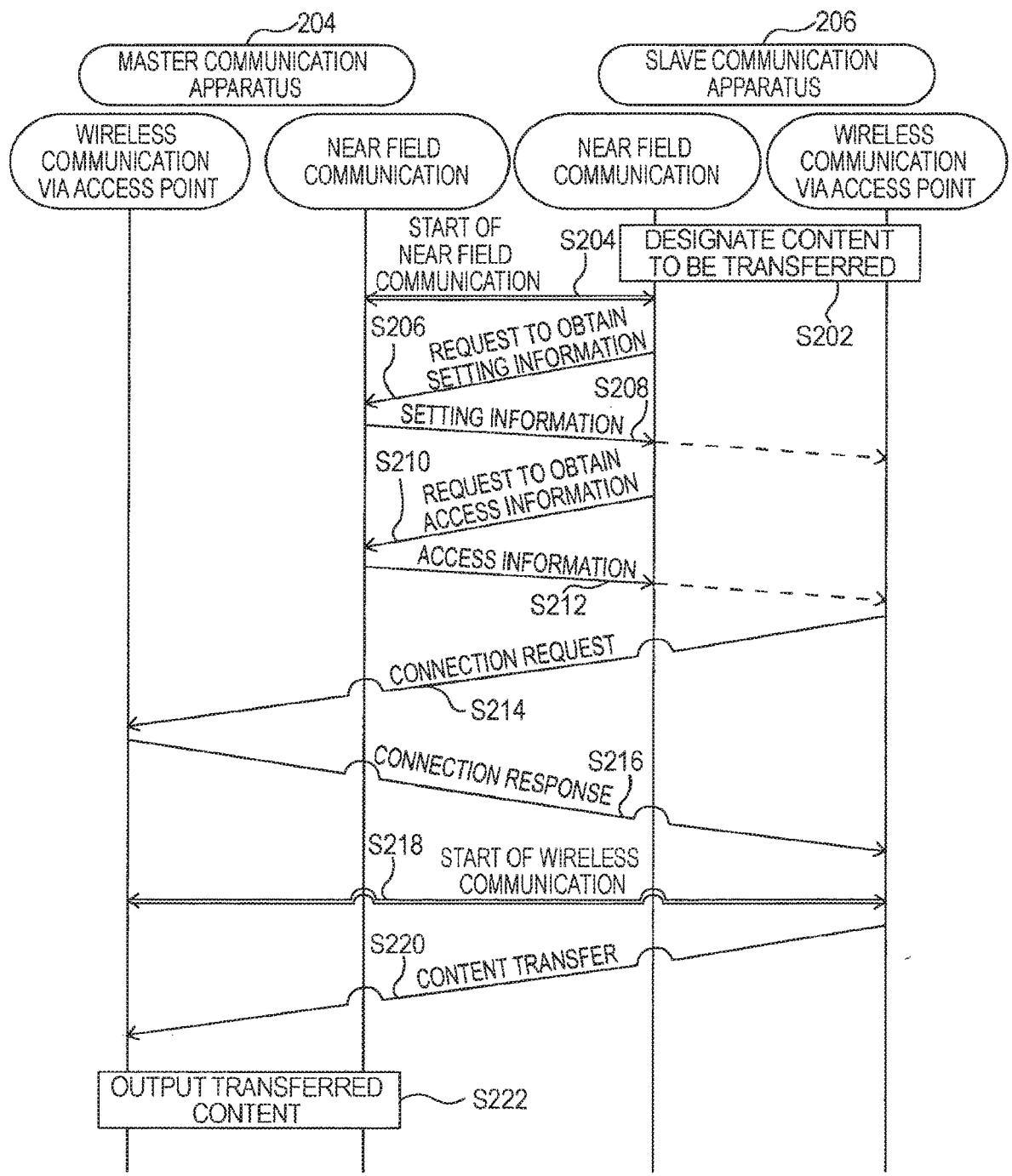
FIG. 6 is a timing chart showing the data flow in the second embodiment.

The functional structure of the master communication apparatus 204 and the slave communication apparatus 206 has been described. The data flow in the wireless communication system 200 when the slave communication apparatus 206 obtains the setting information from the master communication apparatus 204 and subsequently transfers content will now be described with reference to FIG. 6.

First, the slave communication apparatus 206 designates content to be transferred (step S202). More specifically, the slave communication apparatus 206 designates the content to be transferred to the master communication apparatus 204 according to an instruction given by the user through the input device. Then, near field communication is started between the master communication apparatus 204 and the slave communication apparatus 206 (step S204). More specifically, for example, when the slave communication apparatus 206 is placed close to the master communication apparatus 204 and the distance between the slave communication apparatus 206 and the master communication apparatus 204 is within the coverage of near field communication, the near field communication units 130 and 146 start near field communication.

Then, the slave communication apparatus 206 transmits a request to obtain the setting information to the master communication apparatus 204 via near field communication (step S206). Upon receiving the request to obtain the setting information, the master communication apparatus 204 transmits the setting information stored therein to the slave communication apparatus 206 via near field communication in response to the request (step S208). Upon receiving the setting information, the slave communication apparatus 206 performs wireless communication through the access point 102 using the setting information.

Upon obtaining the setting information in step S208, the slave communication apparatus 206 sends a request to obtain access information on the master communication apparatus 204 to the master communication apparatus 204 via near field communication (step S210). In response to the request, the master communication apparatus 204 transmits the access information to the slave communication apparatus 206 via near field communication (step S212).

Upon obtaining the access information from the master communication apparatus 204, the slave communication apparatus 206 uses the obtained access information and the setting information obtained in step S208 to send a connection request to the master communication apparatus 204 via wireless communication through the access point 102 (step S214). When the master communication apparatus 204 transmits a response indicating "connection OK" in response to the connection request (step S216), wireless communication is started between the master communication apparatus 204 and the slave communication apparatus 206 through the access point 102 (step S218). When the wireless communication is started, the slave communication apparatus 206 transmits the content designated in step S202 to the master communication apparatus 204 (step S220), and the master communication apparatus 204 outputs the received content (step S222).

The data flow between the master communication apparatus 204 and the slave communication apparatus 206 has been described. The flow of information processing performed by the slave communication apparatus 206 and the master communication apparatus 204 will now be described.

Figure 7:
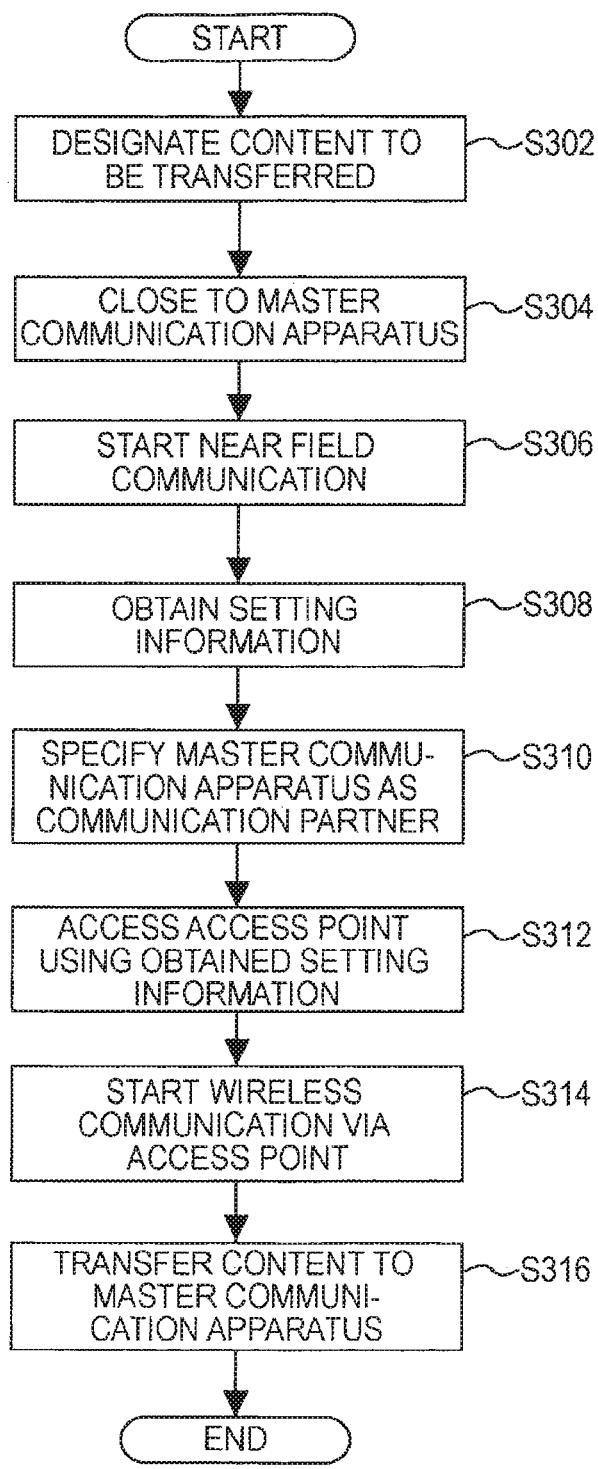
FIG. 7 is a flowchart showing the flow of information processing performed by the slave communication apparatus in the second embodiment.

As shown in FIG. 7, first, the slave communication apparatus 206 designates content to be transferred (step S302). Then, the user places the slave communication apparatus 206 close to the master communication apparatus 204 (step S304). When the distance between the slave communication apparatus 206 and the master communication apparatus 204 is within a predetermined distance, the slave communication apparatus 206 starts near field communication with the master communication apparatus 204 (step S306). When the near field communication is started, the slave communication apparatus 206 obtains the setting information from the master communication apparatus 204 via near field communication (step S308). Then, the slave communication apparatus 206 specifies the master communication apparatus 204 as the communication partner (step S310). More specifically, the slave communication apparatus 206 obtains access information from the master communication apparatus 204, and specifies the master communication apparatus 204 specified by the access information as a communication partner at the other end of the wireless communication through the access point 102.

Then, the slave communication apparatus 206 uses the setting information obtained in step S308 to access the access point 102 (step S312), and starts wireless communication through the access point 102 (step S314). Then, the slave communication apparatus 206 transfers the content designated in step S302 to the master communication apparatus 204 specified as the communication partner in step S310 (step S316).

Figure 8:
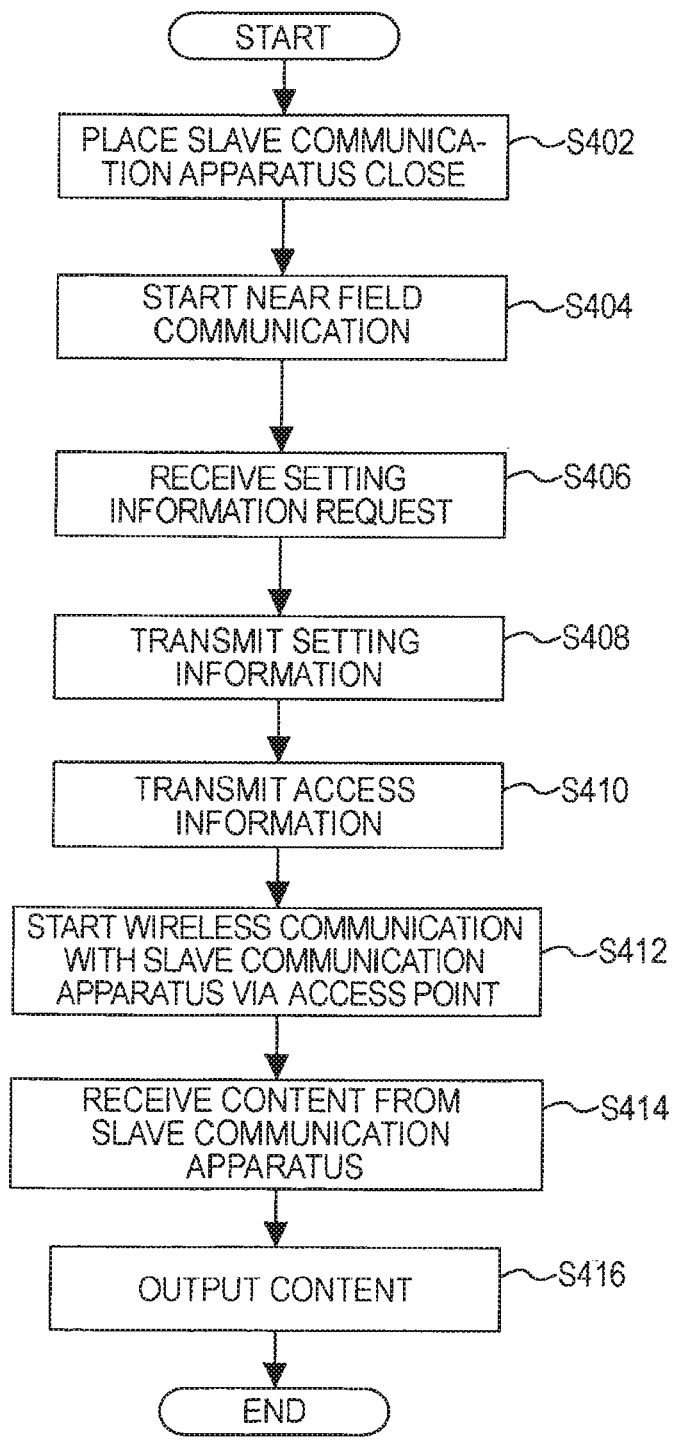
FIG. 8 is a flowchart showing the flow of information processing performed by the master communication apparatus in the second embodiment.

As shown in FIG. 8, first, the slave communication apparatus 206 is placed close to the master communication apparatus 204 (step S402). When the distance between the master communication apparatus 204 and the slave communication apparatus 206 is within the predetermined distance, the master communication apparatus 204 starts near field communication with the slave communication apparatus 206 (step S404). When the near field communication is started, the master communication apparatus 204 receives a setting information request from the slave communication apparatus 206 (step S406). In response to the received request, the master communication apparatus 204 transmits the setting information to the slave communication apparatus 206 via near field communication (step S408). The master communication apparatus 204 further transmits the access information in response to an access information request received from the slave communication apparatus 206 (step S410).

Then, in response to a connection request from the slave communication apparatus 206 via wireless communication through the access point 102, the master communication apparatus 204 starts wireless communication with the slave communication apparatus 206 through the access point 102 (step S412). Then, the master communication apparatus 204 receives content from the slave communication apparatus 206 (step S414), and outputs the received content (step S416). The flow of the information processing performed by the communication apparatuses 204 and 206 has been described.

In the second embodiment, therefore, the slave communication apparatus 206 specifies the master communication apparatus 204 from which the setting information is obtained as a communication party at the other end of the wireless communication through the access point 102 before transferring content. That is, the slave communication apparatus 206 transfers content to the master communication apparatus 204, which is at the other end of the near field communication with the slave communication apparatus 206. Therefore, the user can transfer the designated content to the master communication apparatus 204 only by placing the slave communication apparatus 206 close to the master communication apparatus 204.

In general, a user sets setting information for accessing an access point in a wireless communication apparatus, and manually specifies a partner apparatus with which he/she is to perform wireless communication through the access point. In the second embodiment, however, a user can set setting information and can specify a communication partner only by performing a single action of placing a wireless communication apparatus (the slave communication apparatus 206) close to another wireless communication apparatus (the master communication apparatus 204). As a result, the user can easily and quickly transfer content stored in the slave communication apparatus 206 to the master communication apparatus 204, and can output the content to the master communication apparatus 204.

Further, an operation of placing the slave communication apparatus 206 close to the master communication apparatus 204 allows for the specification of the destination to which the content stored in the slave communication apparatus 206 is to be transferred. The user can perform such an intuitively operation.

While in the second embodiment, the content has been described in the context of image content, the present invention is not limited thereto. For example, the content may be music. In that case, the slave communication apparatus 206 may be a portable music player, and the master communication apparatus 204 may be a fixed music player.

The slave communication apparatus 206 may designate the content to be transferred by, instead of inputting the content from the user using the input device, automatically designating the content currently being played back by a content playback unit (not shown) included in the slave communication apparatus 206 as the content to be transferred. When the content currently being played back is designated as the content to be transferred, information regarding a position (playback position) up to which the content has been played back by the slave communication apparatus 206 is transmitted together with the content to the master communication apparatus 204, whereby the master communication apparatus 204 can play back the content from that position according to the obtained position information.

That is, a song played back and output by the slave communication apparatus 206 is played back and output by the master communication apparatus 204 from the last point at which the song was played back by the slave communication apparatus 206. Therefore, a user who is listening to a song by playing back music content using the slave communication apparatus 206 can listen to the song output from the master communication apparatus 204 by placing the slave communication apparatus 206 close to the master communication apparatus 204 and designating the output destination of the song as the master communication apparatus 204. Further, the master communication apparatus 204 may play back the content received from the slave communication apparatus 206 in a streaming manner. In that case, the slave communication apparatus 206 transfers the music content to the master communication apparatus 204 not as files but as streaming data, and the master communication apparatus 204 synchronizes the transferred data and outputs audio using a speaker.

Third Embodiment

A wireless communication system according to a third embodiment of the present invention will be described in the context of a wireless communication system 300 including a master communication apparatus 304 and a slave communication apparatus 306 between which wireless communication can be performed through an access point 102. The third embodiment is similar to the first embodiment in that the slave communication apparatus 306 obtains setting information necessary for accessing the access point 102 from the master communication apparatus 304 via near field communication. The third embodiment is similar to the second embodiment in that data is transmitted and received between the master communication apparatus 304 and the slave communication apparatus 306 through the access point 102 after the setting information is transmitted and received. In the second embodiment, the slave communication apparatus 206 specifies the master communication apparatus 204 from which the setting information is obtained as the communication partner and transmits data to the master communication apparatus 204. In the third embodiment, unlike the second embodiment, the master communication apparatus 304 specifies the slave communication apparatus 306 to which the setting information is transmitted as a communication party at the other end of the wireless communication through the access point 102, and transmits data to the slave communication apparatus 306. The following description will be made with respect to the difference from the first embodiment and the second embodiment.

Figure 9:
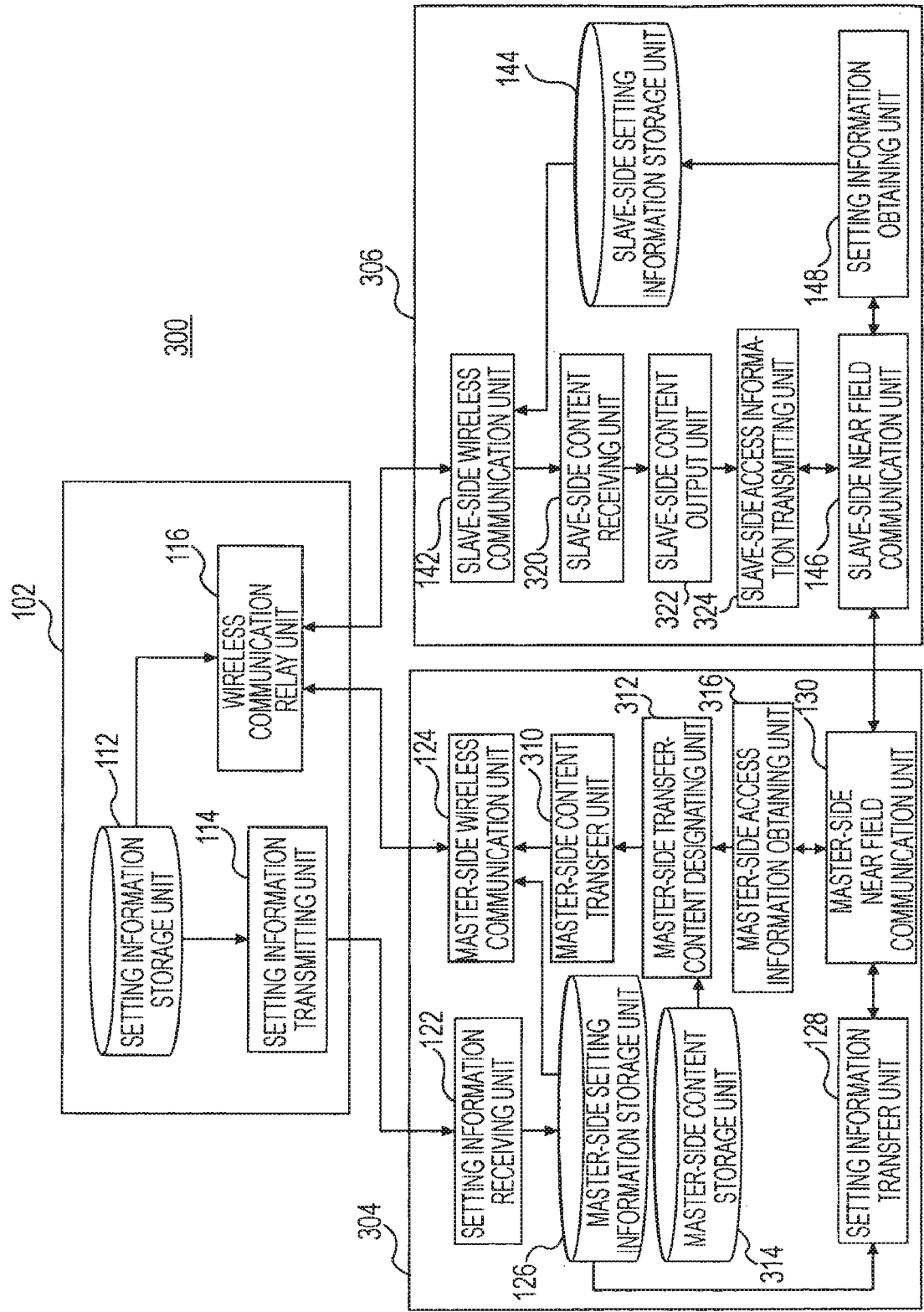
FIG. 9 is a block diagram showing a functional structure of an access point, a master communication apparatus, and a slave communication apparatus according to a third embodiment of the present invention.

First, the overall structure of the wireless communication system 300 according to the third embodiment will be described with reference to FIG. 9. As shown in FIG. 9, the wireless communication system 300 includes the access point 102, the master communication apparatus 304, and the slave communication apparatus 306. As in the first embodiment, the master communication apparatus 304 and the slave communication apparatus 306 perform near field communication. Further, the master communication apparatus 304 and the slave communication apparatus 306 can perform wireless communication through the access point 102 using the setting information.

The master communication apparatus 304 has the setting information stored therein, and can transfer the setting information to the slave communication apparatus 306. Further, the master communication apparatus 304 obtains access information, which is necessary to communicate with the slave communication apparatus 306 via wireless communication through the access point 102, from the slave communication apparatus 306 via near field communication, and uses the obtained access information to access the slave communication apparatus 306 through the access point 102. The slave communication apparatus 306 can obtain the setting information from the master communication apparatus 304, and can perform wireless communication through the access point 102 after obtaining the setting information.

In the third embodiment, the slave communication apparatus 306 is a portable music player having both the wireless communication function through the access point 102 and the near field communication function. The master communication apparatus 304 is a personal computer having both the wireless communication function through the access point 102 and the near field communication function, and is capable of storing music content. After the setting information and the access information are transmitted and received between the master communication apparatus 304 and the slave communication apparatus 306 via near field communication, the music content stored in the master communication apparatus 304 is transmitted and received via wireless communication through the access point 102, and the slave communication apparatus 306 can output the music content received from the master communication apparatus 304.

The overall structure of the wireless communication system 300 has been described. The functional structure of the master communication apparatus 304 and the slave communication apparatus 306 will be described with reference to FIG. 9. The functional structure of the access point 102 is similar to that of the first embodiment, and a description thereof is thus omitted.

As shown in FIG. 9, the master communication apparatus 304 mainly includes a setting information receiving unit 122, a master-side wireless communication unit 124, a master-side setting information storage unit 126, a master-side content transfer unit 310, a master-side content storage unit 314, a master-side transfer-content designating unit 312, a master-side access information obtaining unit 316, a setting information transfer unit 128, and a master-side near field communication unit 130. Elements having similar functions to those of the first embodiment are assigned the same reference numerals, and a description is omitted.

The master-side access information obtaining unit 316 obtains access information from the slave communication apparatus 306. The access information includes an identifier for uniquely identifying the slave communication apparatus 306 within the wireless communication system 300. The master-side access information obtaining unit 316 transmits a request for requesting access information on the slave communication apparatus 306 to the slave communication apparatus 306 through the master-side near field communication unit 130, and receives the access information transmitted from the slave communication apparatus 306 in response to the request through the master-side near field communication unit 130. The access information obtained by the master-side access information obtaining unit 316 is used to specify the slave communication apparatus 306 as a transmission-destination communication apparatus when the master-side content transfer unit 310 transmits the music content to the slave communication apparatus 306 via wireless communication through the access point 102.

The master-side transfer-content designating unit 312 includes, for example, an input device such as a keyboard, a touch panel, and a mouse, and an output device such as a liquid crystal display configured to display a list of music content items, and designates a content item to be transferred from among a plurality of music content items stored in the master-side content storage unit 314. More specifically, the master-side transfer-content designating unit 312 displays a list of music content items, including titles of songs and names of artists, on the output device so that the user can select the content to be transferred, and obtains one or a plurality of music content items designated by the user through the input device from the master-side content storage unit 314 to supply the selected content item or items to the master-side content transfer unit 310.

The master-side content storage unit 314 stores content. In the third embodiment, digital data of songs downloaded by the master communication apparatus 304 via the Internet, ripped from music compact disks (CDs), or transferred from other communication apparatuses or the like is stored in the master-side content storage unit 314.

The master-side content transfer unit 310 transmits the music content designated by the master-side transfer-content designating unit 312 to the slave communication apparatus 306. More specifically, the master-side content transfer unit 310 performs wireless communication through the access point 102 using the setting information stored in the master-side setting information storage unit 126. At that time, the master-side content transfer unit 310 also accesses the slave communication apparatus 306 using the access information on the slave communication apparatus 306 obtained by the master-side access information obtaining unit 316. Then, the master-side content transfer unit 310 transmits the music content designated by the master-side transfer-content designating unit 312 to the slave communication apparatus 306 specified by the access information via wireless communication through the access point 102.

The master communication apparatus 304 may be configured such that a list of music content items that can be transferred to the slave communication apparatus 306 is transmitted via near field communication and the master-side content transfer unit 310 transmits the content selected by the slave communication apparatus 306.

The functional structure of the slave communication apparatus 306 will now be described with reference to FIG. 9. The slave communication apparatus 306 mainly includes a slave-side wireless communication unit 142, a slave-side setting information storage unit 144, a slave-side content receiving unit 320, a slave-side content output unit 322, a slave-side access information transmitting unit 324, a slave-side near field communication unit 146, and a setting information obtaining unit 148.

The slave-side access information transmitting unit 324 transmits the access information to the master communication apparatus 304. More specifically, the slave-side access information transmitting unit 324 receives an access information request from the master communication apparatus 304 through the slave-side near field communication unit 146, and transmits the access information to the master communication apparatus 304 via near field communication in response to the request.

The slave-side content receiving unit 320 receives music content transmitted from the master communication apparatus 304. The slave-side content receiving unit 320 receives through the slave-side wireless communication unit 142 the music content transmitted by the master communication apparatus 304 via wireless communication through the access point 102, and supplies the received music content to the slave-side content output unit 322. The slave communication apparatus 306 may further include a storage unit for storing the music content received by the slave-side content receiving unit 320.

The slave-side content output unit 322 includes an audio output device such as a speaker, and plays back the music content obtained from the slave-side content receiving unit 320 to output audio.

Figure 10:
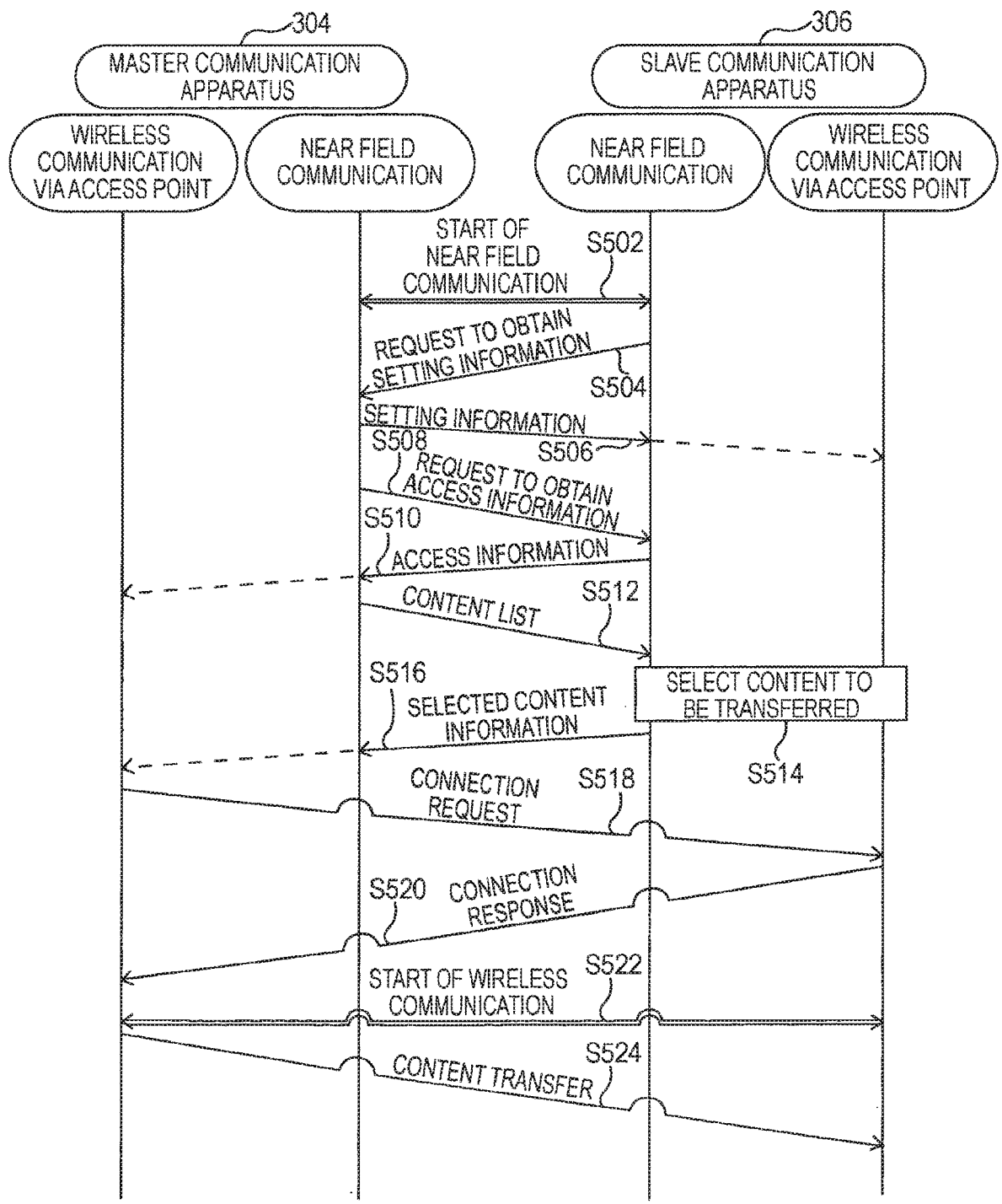
FIG. 10 is a timing chart showing the data flow in the third embodiment.

The functional structure of the master communication apparatus 304 and the slave communication apparatus 306 has been described. The data flow in the wireless communication system 300 when the slave communication apparatus 306 obtains the setting information from the master communication apparatus 304 and then the master communication apparatus 304 transfers content to the slave communication apparatus 306 will now be described with reference to FIG. 10.

The following description will be made of the data flow when the master communication apparatus 304 transmits via near field communication a list of music content items that can be transferred to the slave communication apparatus 306 and the master-side content transfer unit 310 transmits the content selected by the slave communication apparatus 306.

First, near field communication is started between the master communication apparatus 304 and the slave communication apparatus 306 (step S502). Then, the slave communication apparatus 306 transmits a request to obtain the setting information to the master communication apparatus 304 via near field communication (step S504). Upon receiving the request to obtain the setting information, the master communication apparatus 304 transmits the setting information stored therein to the slave communication apparatus 306 via near field communication in response to the request (step S506). Upon receiving the setting information, the slave communication apparatus 306 perform wireless communication through the access point 102 using the setting information.

After transmitting the setting information in step S506, the master communication apparatus 304 sends via near field communication a request to obtain access information on the slave communication apparatus 306 to the slave communication apparatus 306 as the transmission destination to which the setting information is transmitted (step S508). In response to the request, the slave communication apparatus 306 transmits the access information to the master communication apparatus 304 via near field communication (step S510).

Upon obtaining the access information from the slave communication apparatus 306, the master communication apparatus 304 transmits a content list (including titles of songs, names of artists, and genres) indicating a list of music content items stored in the master communication apparatus 304 to the slave communication apparatus 306 via near field communication (step S512). The slave communication apparatus 306 selects one or a plurality of content lists from the received content list according to an instruction given by the user (step S514), and transmits information on the selected content (such as an ID for uniquely identifying the content) to the master communication apparatus 304 via near field communication (step S516).

Upon receiving the selected-content information, the master communication apparatus 304 uses the access information obtained in step S510 to send a connection request to the slave communication apparatus 306 via wireless communication through the access point 102 (step S518). When the slave communication apparatus 306 transmits a response indicating "connection OK" in response to the connection request (step S520), wireless communication is started between the master communication apparatus 304 and the slave communication apparatus 306 through the access point 102 (step S522). When the wireless communication is started, the master communication apparatus 304 transmits the content designated according to the selected-content information received in step S516 to the slave communication apparatus 306 (step S524).

In the third embodiment, therefore, the master communication apparatus 304 specifies the slave communication apparatus 306 to which the setting information is transmitted as a communication party at the other end of the wireless communication through the access point 102 before transferring content. That is, the master communication apparatus 304 transfers content to the slave communication apparatus 306, which is at the other end of the near field communication with the master communication apparatus 304. Therefore, the user can transfer the content stored in the master communication apparatus 304 to the slave communication apparatus 306 only by placing the slave communication apparatus 306 close to the master communication apparatus 304. Content is generally transferred using wireless communication through an access point, which realizes higher communication speed than near field communication, and content with a large data size, such as music content and video content, can be efficiently transferred. Unlike near field communication, the distance between the slave communication apparatus 306 and the master communication apparatus 304 is not necessarily maintained within a predetermined distance during transfer of the content.

Further, as in the second embodiment, in general, a user sets setting information for accessing an access point in a wireless communication apparatus, and manually specifies a partner apparatus with which he/she is to perform wireless communication through the access point. In the third embodiment, however, a user can set the setting information and can specify a communication partner only by performing a single action of placing a wireless communication apparatus (the slave communication apparatus 306) close to another wireless communication apparatus (the master communication apparatus 304). As a result, the user can easily and quickly transfer content stored in the master communication apparatus 304 to the slave communication apparatus 306.

While preferred embodiments of the present invention have been described with reference to the accompanying drawings, it is to be understood that the present invention is not limited to those embodiments. It is to be anticipated by those skilled in the art that a variety of modifications or alterations may be made without departing from the scope of the invention and that these modifications or alterations also fall within the technical scope of the present invention.

For example, while in the second and third embodiments, content is transmitted and received immediately after setting information and access information are transmitted and received, the present invention is not limited to those embodiments. For example, content may be transmitted and received after a predetermined time has elapsed after the transmission and reception of setting information and access information, or content may be transmitted and received when a master communication apparatus or a slave communication apparatus receives an instruction from a user.

In the third embodiment, a content list is transferred via near field communication. Alternatively, a content list can be transferred using wireless LAN or the like.

While in the embodiments described above, wireless communication through an access point has been described in the context of wireless communication using a wireless LAN, the present invention is not limited to those embodiments. For example, the wireless communication may be wireless communication using Bluetooth or Ultra Wide Band (UWB) technology.

It should be understood by those skilled in the art that various modifications, combinations, sub-combinations and alterations may occur depending on design requirements and other factors insofar as they are within the scope of the appended claims or the equivalents thereof.

What is claimed:

1. A mobile communication apparatus, comprising:
a first wireless communication unit configured to communicate with an external mobile communication apparatus via a first wireless communication standard;
a second wireless communication unit configured to communicate with the external mobile communication apparatus via an access point using a second wireless communication standard, wherein a range of the first wireless communication standard is shorter than a range of the second wireless communication standard;
a memory storing program code; and
a processor configured to execute the program code to perform operations comprising:
receiving a credential through the first wireless communication unit from the external mobile communication apparatus, the credential being used to access the access point through the second wireless communication unit,
separately from receiving the credential, receiving access information from the external mobile communication apparatus through the first wireless communication unit, the access information being used to access the external mobile communication apparatus through the access point to complete a content transfer, and
communicating with the external mobile communication apparatus via the access point using the second wireless communications standard to complete the content transfer.

2. The mobile communication apparatus according to claim 1, wherein the credential includes a key to enable communication with the access point.

3. The mobile communication apparatus according to claim 1, wherein the second wireless communication standard is a wireless LAN standard.

4. The mobile communication apparatus according to claim 1, wherein the operations further comprise:
sending a content data through the second wireless communication unit to the external mobile communication apparatus through the access point to complete the content transfer.

5. The mobile communication apparatus according to claim 4, wherein the content data includes a software application.

6. The mobile communication apparatus according to claim 4, wherein the content data includes a video content item.

7. A communication method comprising:
communicating with an external mobile communication apparatus via a first wireless communication standard;
communicating via an access point using a second wireless communication standard, wherein a range of the first wireless communication standard is shorter than a range of the second wireless communication standard;
receiving a credential through the first wireless communication standard from the external mobile communication apparatus, the credential being used to access the access point through the second wireless communication standard;
separately from receiving the credential, receiving access information from the external mobile communication apparatus using the first wireless communication standard, the access information being used to access the external mobile communication apparatus through the access point to complete a content transfer; and
communicating with the external mobile communication apparatus via the access point using the second wireless communications standard to complete the content transfer.

8. The communication method according to claim 7, wherein the credential includes a key to enable communication with the access point.

9. The communication method according to claim 7, wherein the second wireless communication standard is a wireless LAN standard.

10. The communication method according to claim 7, further comprising:
sending a content data using the second wireless communication standard to the external mobile communication apparatus through the access point to complete the content transfer.

11. The communication method according to claim 10, wherein the content data includes a software application.

12. The communication method according to claim 10, wherein the content data includes a video content item.

13. A non-transitory computer-readable medium storing instructions executable by a processor of a mobile communication apparatus to perform operations comprising:
communicating with an external mobile communication apparatus via a first wireless communication standard;
communicating via an access point using a second wireless communication standard, wherein a range of the first wireless communication standard is shorter than a range of the second wireless communication standard;
receiving a credential through the first wireless communication standard from the external mobile communication apparatus, the credential being used to access the access point through the second wireless communication standard;
separately from receiving the credential, receiving access information from the external mobile communication apparatus using the first wireless communication standard, the access information being used to access the external mobile communication apparatus through the access point to complete a content transfer; and
communicating with the external mobile communication apparatus via the access point using the second wireless communications standard to complete the content transfer.

14. The non-transitory computer-readable medium according to claim 13, wherein the credential includes a key to enable communication with the access point.

15. The non-transitory computer-readable medium according to claim 13, wherein the second wireless communication standard is a wireless LAN standard.

16. The non-transitory computer-readable medium according to claim 13, further comprising:
sending a content data using the second wireless communication standard to the external mobile communication apparatus through the access point to complete the content transfer.

17. The non-transitory computer-readable medium according to claim 16, wherein the content data includes a software application.

18. The non-transitory computer-readable medium according to claim 16, wherein the content data includes a video content item.

\* \* \* \* \*